March 10, 1959
J. H. EDMAN
2,876,797
FLUID PRESSURE CONTROL VALVE
Filed May 16, 1957
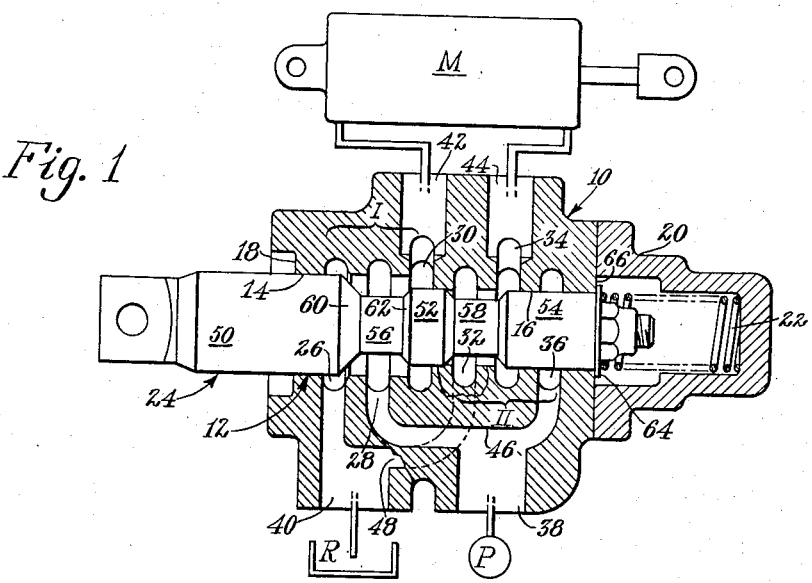
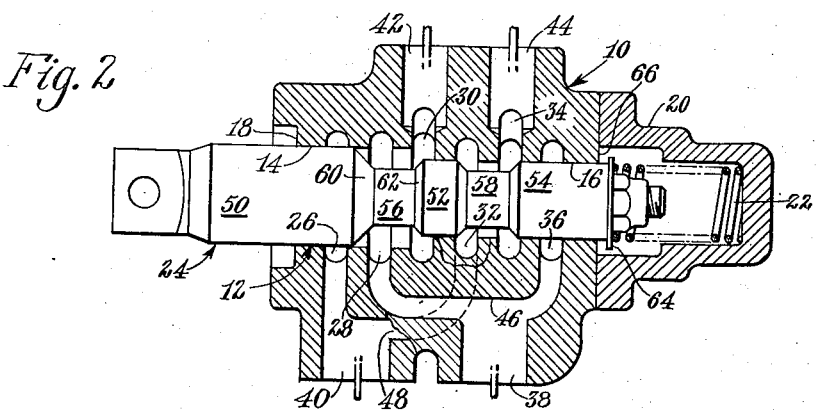
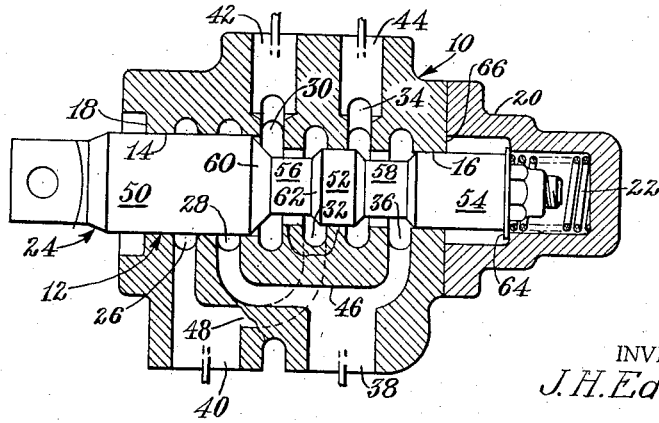
INVENTOR.
J. H. Edman

United States Patent Office 2,876,797
Patented Mar. 10, 1959

2,876,797

FLUID PRESSURE CONTROL VALVE

John H. Edman, Waterloo, Iowa, assignor, by mesne assignments, to Deere & Company, a corporation of Delaware Application May 16, 1957, Serial No. 659,680

3 Claims. (Cl. 137—622)

This invention relates to a fluid pressure control valve and more particularly to an improved valve enabling throttling of the reservoir port to afford the operator a sense of feel while he controls the system in which the valve is incorporated.

It is an important object of the invention to provide an improved valve having pump, reservoir and first and second motor parts initially in communication, and a valve plunger movable from a neutral position to gradually throttle the pump delivery to reservoir while maintaining the first motor port in communication with the pump and simultaneously connecting the second motor port to reservoir only. It is a further feature to provide in the valve a fluid-pressure-receivable area enabling the generation of a hydraulic axial unbalance which is in direct relationship to the pressure load on the first motor port and thereby gives the operator the sense of feel of the force being applied to and by the motor, which enables him to control the output to the first motor port. The unbalance force tends to return the valve to neutral. A still further significant feature of the invention resides in the provision of a novel two-way valve in which a valve plunger is movable in one direction from a neutral position to a first active position and is movable further in the same direction to a second active position beyond the first active position, thereby enabling the valve to lend itself particularly to conditions to which a valve having a central neutral position is not adapted. Further features of the invention reside in an improved over-all construction entailing simplicity, low cost and adaptability to a wide variety of control systems.

The foregoing and other important objects and desirable features inherent in and encompassed by the invention will become apparent as a preferred embodiment of the invention is disclosed in detail in the ensuing specification and accompanying sheet of drawings, the several figures of which are described immediately below.

Fig. 1 is a sectional view of the valve in neutral, with a pump, reservoir and motor shown schematically in associated relation.

Fig. 2 is a similar view showing the valve in its first active position.

Fig. 3 is a similar view showing the valve in its second active position.

The valve chosen for purposes of illustration comprises a casing or housing 10 having an axial valve bore 12 which is here made up of a first or large-diameter part or portion 14 and a reduced or small-diameter part or portion 16. For purposes of convenience, the bore will be described as having outer and inner ends, the former being indicated at 18 and the latter at 20 as comprising a cap for containing biasing means in the form of a return spring 22 for neutralizing a valve plunger 24.

The casing has a plurality of control ports, here arranged in two groups I and II, each group containing three ports. The group I may be referred to as an outer group, since it is adjacent to the outer end 18 of the bore 12, which establishes the second group as an inner group.

The outer group comprises a reservoir port 26, a pump port 28 next inwardly of the reservoir port 26 and a motor port 30 next inwardly of the pump port 28. The three ports in the inner group II are axially inwardly of the first group and this group includes a reservoir port 32, a second motor port 34 inwardly of the reservoir port 32 and a second pump port 36 inwardly of the motor port 34. The casing has a pump inlet 38 connected to a pump shown schematically at P and a reservoir outlet 40 connected to a reservoir shown schematically at R. The motor ports 30 and 34 lead via motor outlets 42 and 44 respectively to opposite ends of a motor M, here shown as of the cylinder and piston type. A pump passage means 46 interconnects the two pump ports 28 and 36, and a reservoir passage means 48 interconnects the two reservoir ports 26 and 32. Although the pump inlet 38 and reservoir outlet 40 are shown substantially in the same plane in the section, it will be understood that this is only a convenient means of illustration and that the inlet and outlet could otherwise be arranged. For example, the casing could be constructed to incorporate a typical relief valve in association with the inlet 38. However, since this is not material to the present disclosure, this and other details have been omitted. In view of the type of section illustrated, a portion of the reservoir passage means 48 is indicated in dotted lines.

The plunger 24 is made up of an outer spool 50, a central spool 52 and an inner spool 54, plus a first groove 56 intermediate or separating the spools 50 and 52 and a second groove 58 intermediate or separating the central and inner spools 52 and 54. At this point, it should be noted that the expression "central" as applied to the spool 52 does not mean that the spool is exactly centrally between the ends of the plunger but is used to indicate that the spool is simply between the spools 50 and 54. The plunger is preferably of one piece construction and the portion thereof including the spools 52 and 54 and the grooves 56 and 58 is of reduced diameter as respects the larger portion incorporating the outer spool 50. Of course, the grooves 56 and 58 are of lesser diameter than the spools 52 and 54. Because of the reduction in diameter, which is required in order that the plunger axially fits the bore portions 14 and 16, the junction between the groove 56 and the spool 50 affords a generally radial fluid-pressure-receivable area or portion 60 which is larger than the area of a similar radial portion 62 at the junction of the groove and the spool 52.

The neutral position of the plunger (Fig. 1) is maintained by a stop washer 64 which abuts a shoulder 66 at the end of the casing 10 and within the cap 20, and which washer is in turn opposed by the return spring 22. When the plunger is shifted to the right (as seen in the drawings), or inwardly, the spring 22 is compressed and when the activating force on the plunger is removed, the spring will return the plunger to the neutral position at which it is stopped by engagement between the washer 64 and the shoulder 66.

Operation

When the plunger is in its neutral position (Fig. 1), it is held outwardly or stopped to the left by engagement between the washer 64 and shoulder 66 on the casing. In this position, the first or outer groove 56 interconnects all ports 26, 28 and 30 of the first group I; the central spool 52 separates the two groups of ports and the groove 58 interconnects the motor and reservoir ports 34 and 32 of the inner or second group II. The spool 54 blocks or closes the pump port 36. Hence, the pump inlet 38 is connected via the passage 46 and pump port 28 to both the reservoir port 26 and motor port 30, and the other motor port 34 is connected to the other reservoir port 32 across the groove 58 of the plunger 24. Thus, the motor is not hydraulically locked and is capable of floating.

When the plunger 24 is moved inwardly, the large or outer spool or land 50 begins to close or throttle the first reservoir port at 26 and in proportion directs the fluid under pressure to the motor outlet 42 via the motor port 30. Since the area 60 at the inner end of the spool 50 is larger than the area 62 on the outer end of the central spool 52, the operator is afforded a sense of feel, because of the hydraulic unbalance which creates an axial force tending to oppose inward movement of the plunger. In this phase of operation, the central spool 52 still separates the two groups of ports and the inner spool 54 still blocks the other motor port 36 while the groove 58 still retains communication between the other motor port 34 and other reservoir port 32. The operator, with this valve, can "hold" the controlled situation, such as in opposition to a force or load, and can speed up or slow down the system between zero and full pump delivery, or variations thereof, one example of which is the effecting of engagement of a clutch which must pick up the load gradually and smoothly, because in a situation like that it is important for the operator to be able to sense and control what is happening.

When the plunger is moved into the full position of Fig. 2, which is the first active position beyond the neutral position of Fig. 1, the spool 50 finally closes the reservoir port 26 and the grooves 56 and 58 and the central spool 52 and inner spool 54 retain their respective relations to the ports, whereby full pump delivery is directed to the motor via the motor outlet 42 and the other motor outlet is connected to the reservoir at 34—58—32.

When the plunger attains its second active position, which is inwardly beyond the active position of Fig. 2 (Fig. 3), the large outer spool 50 blocks or closes both the first pump port 28 and the first reservoir port 26, the groove 56 now interconnecting the first motor port 30 and the second reservoir port 32. The central spool 52 separates the second reservoir port 32 from the other pump port 36 and the other motor port 34, whereas the groove 58 now interconnects the pump port 36 and the motor port 34, the inner spool 54 moving axially inwardly a sufficient distance to uncover the pump port 36. Hence, fluid is now supplied under pressure to the opposite end of the motor M via the motor outlet 44 and the other motor outlet 42 returns to reservoir at 30—56—32. Since the reservoir ports 26 and 32 are interconnected by the passage 48, the necessary connections of the motor outlets to the reservoir are effected. The same is true relative to the interconnecting passage 46 between the pump ports 28 and 36. These passage connections could, if desired, be effected externally of the casing.

In the second active position, the sense of feel afforded in movement between neutral and the first active position (between Figs. 1 and 2) is not available in this form of the invention, but normally in that situation no sense of feel is required. It is of course within the scope of the invention that the sense of feel could be duplicated by modifying the valve plunger.

Regardless of the position to which the valve is moved away from neutral, the return spring 22 will return it to neutral. In addition, the return to neutral will be effected by pump pressure on the area 60 in the transition between Figs. 1 and 2.

*Summary*

As will be seen, the control valve is simply designed and constructed and yet is extremely flexible in its application to a wide variety of control situations. It is particularly adapted to control by a pedal, for example, because the two active positions are in sequence and not at opposite sides of neutral as in a conventional valve. In addition to the foregoing, the sense of feel afforded by the provision of the large fluid-pressure-receivable area at 60 is a significant feature and contributes materially to the type of operation that the control valve is capable of giving. Features and characteristics not categorically enumerated will undoubtedly occur to those versed in the art, as will many modifications and alterations in the preferred embodiment disclosed, all of which may be achieved without departure from the spirit and scope of the invention.

What is claimed is:

1. A fluid pressure control valve, comprising: a valve casing having an axial valve bore including inner and outer ends, said casing further including axially spaced apart outer and inner groups of ports, said outer group having a first reservoir port and a first pump port and a first motor port axially inwardly of said reservoir port, and said inner group having a second reservoir port and a second pump port and a second motor port axially inwardly of said second reservoir port; and a valve plunger axially shiftable in said bore and including outer, central and inner spools, a first groove between the central and outer spools and a second groove between the central and inner spools, said plunger having a neutral position in which the central spool separates the two groups, the first groove interconnects all ports in the outer group, the second groove interconnects the second motor and second reservoir ports and the inner spool closes the second pump port, said plunger being axially inwardly shiftable to a first active position in which the outer spool blocks the first reservoir port while the first groove interconnects the first pump and first motor ports, the central spool retains its separation of the two groups, the second groove retains its connection of the second motor and second reservoir ports and the inner spool retains its closure of the second pump port, and said plunger being further axially inwardly shiftable to a second active position in which the outer spool closes the first reservoir and first pump ports, the central spool separates the second reservoir port from the second motor and second pump ports while the first groove connects the second reservoir port to the first motor port, and the inner spool opens the second pump port while the second groove connects said second pump port to the second motor port.

2. The invention defined in claim 1, in which: the casing includes, separate from the bore, a reservoir passage means interconnecting the two reservoir ports and a separate pump passage interconnecting the two pump ports.

3. The invention defined in claim 1, in which: the bore is of reduced diameter in the portion thereof to which the inner group of ports leads, the plunger is correspondingly reduced in the portion thereof containing the grooves and inner and central spools to thereby afford on the outer spool, at the junction thereof with the first groove, a relatively large area exposed to pump pressure in the neutral and first active positions of the plunger.

References Cited in the file of this patent

UNITED STATES PATENTS

| 2,000,805 | West | May 7, 1935 |
| 2,370,137 | Biggert | Feb. 27, 1945 |
| 2,380,705 | Proctor | July 31, 1945 |
| 2,702,529 | Doerfner | Feb. 22, 1955 |
| 2,798,461 | Gold | July 9, 1957 |

FOREIGN PATENTS

| 598,670 | Great Britain | Feb. 24, 1948 |